Jan. 20, 1959    R. H. COOPER ET AL    2,870,110
POROUS COMPOSITION CONTAINING A PHENOL-ALDEHYDE
RESIN, METHOD OF PREPARATION, AND ARTICLE
FABRICATED THEREFROM
Filed Sept. 26, 1956

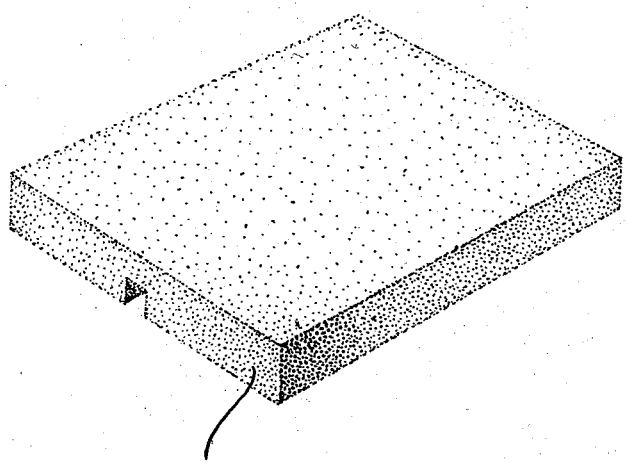

Pre-cast filter plate fabricated from composition comprised of inert particulate filler bonded with magnesium oxide catalyzed phenolic resin binder.

INVENTORS.
Ronald H. Cooper
BY Leland C. Johnson

Griswold & Burdick
ATTORNEYS

United States Patent Office 2,870,110
Patented Jan. 20, 1959

2,870,110

POROUS COMPOSITION CONTAINING A PHENOL-ALDEHYDE RESIN, METHOD OF PREPARATION, AND ARTICLE FABRICATED THEREFROM

Ronald H. Cooper, Clare, and Leland C. Johnson, Midland, Mich., assignors to The Dow Chemical Company, Midland, Mich., a corporation of Delaware Application September 26, 1956, Serial No. 612,290

12 Claims. (Cl. 260—29.3)

This invention has reference to the provision of improved resin bonded porous media that may be pre-cast for employment and utilization as rigid, sturdy, integral, permeable structures. It also relates to the compositions that are adapted to be formed into such structures and to a method for forming such structures from said compositions.

Various types of porous media have found application for such purposes and in such uses as filtration, diffusion and as supporting substrates or beds for a variety of substances including ion exchange materials. The porous media that have been employed have frequently been prepared by bonding inert, particulate materials together to an integral, permeable mass. Thus, by way of illustration, granular alumina has been electrically fused together for such purposes, and various carbonaceous and other particulate fillers have been agglomerated by means of resin binders, oftentimes of the acid catalyzed phenolic variety. Additional known porous media of this general nature include bonded particulate rubber, plastic and silica compositions.

Several difficulties, however, are inherent in the manufacture and use of the conventional porous media. At the outset, they are often tedious to prepare and require extensive periods of time, generally at least 24 hours and often 3 to 4 days, or so, for their fabrication. Furthermore, they may not always have a desirably uniform or adequate permeability. In addition, they may not be possessed of satisfactorily high strength and may be susceptible to deterioration upon exposure to water or acidic materials. They may also tend to shrink in use or to contract under the effects of extreme conditions of humidity. The known media of the resin bonded variety may also require uneconomic proportions of the resin as a binder ingredient.

It would be advantageous to provide compositions that would be especially well-adapted to be fabricated into porous media, and the porous media obtainable therewith, that would be substantially free from such drawbacks. It would be particularly expeditious if such compositions could be quickly and easily fabricated into the desired media in mere fractions, say in the neighborhood of one-twentieth to one-hundredth or less, of the time customarily required for such purposes. It would be especially desirable if strong and rigid structures, having ample and regular porosity, could be achieved with minimum requirements for employment of a binder ingredient. It would be additionally advantageous if the porous media provided from such compositions were not prone to shrink in use or to swell or contract in relatively humid atmospheres and if they could readily and successfully withstand prolonged exposures to water and acids. Another desideration of not inconsequential aspect for such porous media and the compositions adapted to provide them is in their being of a significantly economical nature in order that their attractiveness in other regards would be maintained within the realm of practicality.

In accordance with the present invention, these and many other advantages and benefits may be achieved with a composition that comprises (A) a preponderant proportion of an inert filler material that consists of a lesser share of (1) a pulverulent filling material selected from the group consisting of graphite powder, silica powder and mixtures thereof with the balance being (2) a relatively coarse particulate aggregate filler from the group consisting of calcined petroleum coke; expanded powerhouse slag, relatively coarse sand and mixtures thereof; and (B) a binding minor proportion of an active powdered magnesium oxide catalyzed aqueous phenolic liquid thermosetting resin. Advantageously, the composition may be comprised of between about 10 and 25 percent by weight, based on the weight of the composition, of the aqueous phenolic resin that has been catalyzed with between about 5 and 25 percent by weight, based on the weight of the resin in the composition, of the active magnesium oxide powder. When a finely divided graphite powder or flour is utilized as the pulverulent material it is desirable for it to have an average particle size finer than about 140 mesh in the U. S. Sieve Series and to comprise between about 5 to 15 percent by weight of the composition. When the pulverulent share of the inert filler is finely divided silica powder or flour, it is beneficial for its average particle size not to be coarser than about 140 mesh in the U. S. Sieve Series and for it to be employed in an amount between about 10 and 25 percent by weight of the composition.

The compositions, freshly after being prepared, are plastic and flowable coated filler mixtures that can be cold worked to form desired structures, such as pre-cast porous media, while they are in a wet condition. Thus, they can be cold pressed as by being rammed into mold forms, advantageously under a pressure between about 80 and 100 pounds per square inch (or more or less depending upon the degree of consolidation desired in the resulting construction) to form a desired structure of the agglomerated, integrated mixture. Or, if desired, they can be deposited into suitable forms with the assistance of a pneumatic blast or spray being operated under pressure, as, for example, in the neighborhood of 80 to 100 pounds per square inch, much in the manner of the core blowing techniques that are employed for sand compositions in certain types of foundry practice. During or after the wet formation of the structure, the agglomerated composition will self-set or auto-harden in the cold at room temperatures to an integrated, bonded magma structure, due primarily to the action of the active magnesium oxide catalyst on the applied resin that coats the filler in the composition. The self-setting or auto-hardening of the wet-formed composition ordinarily occurs within an hour at room temperature, after which the structure may be cured at temperatures between about 250 and 600° F. or higher or lower (depending, of course, upon the dimensions of the involved structure and the contact time employed at the curing temperature) until it has been thermoset to a strong and rigid form suitable for the intended employment. Generally, the auto-hardened structures may be satisfactorily cured by exposure to a thermo-setting temperature of about 475–500° F. for a period of time of at least 45 to 60 minutes.

The cured structure, when it is a porous medium may then be employed for filtration of gaseous or liquid fluids or to effect their diffusion. It may also be advantageously utilized as a support for many types of ion exchange resins. The structures are strong and may easily be made to be light in weight, will not shrink intolerably in use or contract excessively in humid atmospheres and are resistant to deterioration from water and acids. A pre-cast, resin bonded porous medium that has been prepared from a composition in accordance with the present invention is schematically illustrated in the accompanying drawing.

Advantageously, a particulate expanded powerhouse slag is employed as the relatively coarse aggregate filler material in the practice of the present invention. Such a material is suitably strong, lightweight and resistant to erosion for such purposes and ordinarily, has the additional benefit of being of an extremely economical nature. An expanded powerhouse slag may be characterized as a non-metallic cellular product that consists essentially of iron and aluminum silicates which is obtained from or by expanding ordinary slag during its solidification from boilers and the like combustion apparatus that are burning conventional solid carbonaceous fuels. The particulate expanded powerhouse slag product may advantageously be crushed to have an average particle size between about 5 and 48 mesh in the U. S. Sieve Series and a bulk density in the neighborhood of 50 pounds per cubic foot. A representative product of this nature may analyze from 20 to 30 percent by weight of aluminum, from 30 to 40 percent by weight of iron, from 20 to 30 percent by weight of silicon, from 3 to 4 percent by weight of magnesium, a like quantity of titanium, up to ½ percent or slightly more by weight of sodium and calcium and varying trace percentages of such elements as barium, cobalt, chromium, copper, gallium, manganese, molybdenum, nickel, boron, tin, strontium, vanadium, zinc and sulfur.

If desired, however, calcined petroleum coke having an average particle size from about 5 to 48 mesh in the U. S. Sieve Series may also be utilized suitably as the relatively coarse aggregate filler in the practice of the invention. Likewise, ordinary relatively coarse sand (such as the types known as Gratiot Bank Sand and Portage 40–60 Sand) that has a fineness in accordance with the values proposed by the American Foundryman's Society (AFS) that is in the numerical range between about 25 and 100, preferably from 33 to 75, may be employed as the aggregate filler. When sand is utilized for such purposes it is desirable for it to be clean and substantially free from foreign metal oxides, clay, moisture and organic matter. Generally, the employment of a relatively coarse aggregate filler that has a larger average particle size facilitates the achievement of porous media having correspondingly greater permeability or porosity.

As has been indicated, the resin binder that is employed in the compositions of the present invention is a self-setting or auto-hardening mixture of an aqueous phenolic liquid resin, such as a phenol-formaldehyde liquid resin, and an active powdered magnesium oxide catalyst that is capable of dehydrating and auto-hardening the liquid resin at room temperatures to a dry thermoplastic-thermosetting mass. Such a resin binder for inert filler materials is described in the copending application of Ronald H. Cooper covering Improved Phenolic Resin Compositions having Serial No. 612,283 that was concurrently filed on September 26, 1956. Thus, the phenolic liquid resin that is employed may be a phenol-formaldehyde condensation product, of the type that is often times characterized as being a Stage "A" resin, that has been prepared by reacting aqueous mixtures of phenol and formaldehyde, in a known manner, under the influence of basic catalysis. Such liquid resins usually have a greater than 1:1 mole ratio of formaldehyde to phenol, respectively, in their compositions. It is oftentimes desirable for a phenol-formaldehyde liquid resin to be employed that has a mole ratio of formaldehyde to phenol in the neighborhood of 1.45:1. The solids content of the liquid resin should be at least 50 to 60 percent by weight, and it may have a viscosity from about 100 to 1000 centipoises at 77° F., and a pH from about 5 to 9. The active powdered magnesium oxide catalyst that is incorporated in such a phenolic liquid resin to achieve its auto-hardening properties may be a finely divided powder that has initial setting characteristics, measured as a function of time according to the procedure set forth in A. S. T. M. Specification No. C254–50T, that is between about 0.1 and 6 hours. Generally, it is beneficial to utilize a magnesium oxide powder that has an average particle size not coarser than about 40 mesh in the U. S. Sieve Series and an initial setting time between about 0.5 and 3 hours.

The time that is required for a magnesium oxide catalyzed phenolic liquid resin to self-set or auto-harden due to the involved catalytic effect depends to a great extent upon the activity or initial setting time of the magnesium oxide powder and the proportion in which it is included with the phenolic liquid resin in the binder. This, of course, limits the time in which a composition with such a liquid resin binder is plastic and flowable so that it may be cold formed to a desired porous medium structure as a wet coated filler composition after its initial preparation. Generally, more active magnesium oxide powders (materials having shorter initial setting times) and greater proportions of included catalyst result in wet mixtures that auto-harden in shorter periods of time after their initial preparation. Compositions that are in accordance with those of the present invention may ordinarily be found to be auto-hardenable within about an hour of their initial preparation, especially when they are catalyzed by a powdered magnesium oxide that has an initial setting time of about one-half hour.

In the formulation of the compositions of the invention, it is essential to achieve a uniform and thorough dispersion and interblending of all of the ingredients. It may frequently be particularly advantageous to prepare the composition by intimately pre-mixing the powdered magnesium oxide catalyst and also the pulverulent filler material with the relatively coarse aggregate filler before homogeneously incorporating the liquid resin therein with sufficient mixing to thoroughly coat the particulate filler ingredients. If desired, however, suitable results can also be achieved by pre-dispersing the powdered catalyst and the pulverulent filler material in the liquid resin before thoroughly inter-blending the mixture with the relatively coarse aggregate filler, especially when only a moderately active catalyst is employed. The formulation can be achieved readily using many available varieties of efficient mixing and mulling apparatus.

By way of further illustration, several mixtures in accordance with the present invention were prepared by intimately interblending the pulverulent and aggregate filler materials with an active powdered magnesium oxide and a phenolic liquid resin with efficient continuous mulling. Each of the wet mixtures were then cold formed into 13 x 3½ x 1½ inch filter plate structures by being packed in molds under a ram pressure of about 90 pounds per square inch. After being molded, each of the formed structures were permitted to auto-harden at room temperatures to an agglomerated, composite, integral mass. This required no more than about an hour in each instance after which each of the porous media structures were cured for about 60 minutes in a gas fired oven at a temperature of about 482° F. Each of the porous media were then tested to determine their water permeability as well as their bond strength, as indicated by their tensile and compression strengths and their moduli of rupture.

In the following tabulation there is set forth the compositions of each of the mixtures and the physical properties that were observed on porous media prepared from them. The crushed expanded powerhouse slag that was employed in Mixtures "A" and "B" had a 5–10 mesh particle size and a density of about 48.8 pounds per square foot. Its chemical composition was in general accordance with that indicated in the preceding specification. Calcined petroleum coke of 5–10 mesh size was utilized in the remaining illustrative mixtures as the aggregate filler ingredient. The finely divided silica powder that was utilized in several of the mixtures was of the 140 mesh variety. The phenolic liquid resin that was employed in all of the mixtures excepting Mixture "G" had a formaldehyde to phenol mole ratio of about 1.45:1, a solids content of about 70 percent by weight, a pH of about 5 and a viscosity at 77° F. of about 500 centipoises. In Mixture "G" the phenolic liquid resin had a 50–60 percent solids content, a pH of 8 and a 300 centipoise viscosity at 77° F. with the same formaldehyde to phenol mole ratio. A 40 mesh magnesium oxide powder with a one-half hour setting time was utilized in all of the compositions.

All of the media, particularly those from Mixtures "A," "B," "E," "F" and "H" had excellently uniform porosity. None of them tended to swell or shrink in use or to expand or contract in the least on exposure to atmospheres having 50 to 80 percent relative humidities. All of the porous media were exceptionally resistant to water and 20 percent muriatic acid solutions, even at near boiling temperatures. Similar results may be achieved when a relatively coarse sand is employed as the aggregate filler ingredient in compositions according to the invention.

By way of contrast, filter plates prepared in the conventional manner from commercially available proprietary resin binders and the usual carbonaceous fillers required about two to four days for total fabrication (24 hours for initial setting and 1 to 3 days for room temperature curing) and did not have superior properties in any respect to the porous media of the present invention. Their tensile strengths varied from about 300 to 540 pounds per square inch and they frequently were observed to shrink or swell in use and to be unstable to aqueous or acidic liquids. Some of the plates prepared in such manner had definitely inferior uniformity of porosity in comparison to those prepared according to the present invention. Filter plates prepared in a known manner from mixtures of calcined petroleum coke and graphite or silica powder bonded with trichloroacetic or benzene sulfonyl chloride acid-catalyzed phenolic liquid resin had definitely inferior strength characteristics to the porous media of the invention, ranging from about 190 to 210 pounds per square inch in their tensile strengths. Commercially available vitrified bonded filter plates from several well known manufacturers were found to have maximum tensile strengths of only about 360 pounds per square inch with values as low as about 220 pounds per square inch being common. A commercially available carbonized pitch bonded plate was found to have a tensile strength of only 50 pounds per square inch.

As is apparent, many types and varieties of structures for a great assortment of purposes in addition to what has been illustrated herein can readily be provided in accordance with the invention.

Certain changes and modifications in the practice of the present invention can be readily entered into without substantially departing from its intended spirit and scope. Therefore, it is to be fully understood that the invention is not to be limited or in any way restricted to or by the foregoing didactic description and specification. Rather, it is to be interpreted and construed in the light of what is set forth and defined in the hereto appended claims.

What is claimed is:

1. Composition for the fabrication of porous media which comprises (A) a preponderant proportion of between about 75 and about 90 percent by weight, based on the weight of the composition, of an inert filler material that consists of a lesser share of between about 5 and 25 percent by weight, based on the weight of the composition, of (1) a pulverulent filling material selected from the group consisting of graphite powder, silica powder and mixtures thereof, with the balance being (2) a relatively coarse particulate aggregate filler selected from the group consisting of calcined petroleum coke, expanded powerhouse slag, relatively coarse sand and mixtures thereof; and (B) a binding minor proportion of between about 25 and about 10 per cent by weight, based on the weight of the composition, of an active powdered magnesium oxide catalyzed aqueous phenolic liquid thermosetting resin binder, said binder containing up to about 25 percent by weight, based on the weight of the composition of the phenolic liquid resin catalyst catalyzed with between about 5 and 25 percent by weight, based on the weight of the resin in the composition, of said active magnesium oxide powder that has an initial setting time of less than about 6 hours; said resin being a phenol-formaldehyde condensation product that has a greater than 1:1 mole ratio of formaldehyde to phenol, respectively, a solids content of at least about 50 percent by weight, a pH between about 5 and 9, and a viscosity at 77° F. between about 100 and 1000 centipoises.

2. The composition of claim 1 wherein said binder contains between about 10 and 25 percent by weight, based on the weight of the composition, of the phenolic liquid resin catalyzed with between about 5 and 25 percent by weight, based on the weight of the resin in the composition, of said active magnesium oxide powder having an initial setting time between about 0.5 and 3.0 hours.

3. The composition of claim 1 in the form of a wet, plastic and flowable mixture.

4. The composition of claim 1, wherein the pulverulent filler material is graphite powder contained in said composition in an amount between about 5 and 15 percent by weight of the composition.

5. The composition of claim 1, wherein the pulverulent filler material is silica powder having an average particle size not coarser than about 140 mesh in the U. S. Sieve Series and contained in said composition in an amount between about 10 and 25 percent by weight of the composition.

6. The composition of claim 1, wherein the relatively coarse aggregate filler is calcined petroleum coke having an average particle size between about 5 and 48 mesh in the U. S. Sieve Series.

7. The composition of claim 1, wherein the relatively

| Mixture | Percent by Weight of Liquid Resin | Percent by Weight of MgO Catalyst | Percent by Wt. of Pulverulent Filler | | Percent by Wt. of Coarse Aggregate Filler | | Tensile Strength of Cured Medium, p. s. i. | Compression Strength of Cured Medium, p. s. i. | Modulus of Rupture of Cured Medium, p. s. i. | Water Permeability to Cured Medium in gals. per min. per sq. ft. per ft. head of water | Density of Cured Medium, Lbs./cu. ft. |
|---|---|---|---|---|---|---|---|---|---|---|---|
| | | | Silica | Graphite | Calcined Petroleum Coke | Expanded Powerhouse Slag | | | | | |
| "A" | 12.5 | 1.25 | 18.75 | | 67.50 | | 525 | 1,890 | 896 | 33.4 | 74.4 |
| "B" | 15.0 | 1.50 | 22.50 | | 61.00 | | 450 | 3,295 | 1,003 | 6.58 | 79.8 |
| "C" | 20.31 | 1.67 | | 13.57 | 64.45 | | 455 | (a) | (a) | 41.6 | 64.7 |
| "D" | 20.31 | 2.00 | | 15.00 | 62.69 | | 485 | 2,132 | 572 | 6.2 | 73.7 |
| "E" | 15.00 | 1.50 | 22.50 | | 61.00 | | 690 | 2,570 | 618 | 38.3 | 65 |
| "F" | 12.50 | 1.25 | 18.75 | | 67.50 | | 360 | 2,108 | 633 | 47.3 | 66.7 |
| "G" | 20.31 | 2.00 | | 13.50 | 62.19 | | 455 | (a) | (a) | 13.9 | 65.4 |
| "H" | 15.00 | 1.50 | 15.00 | | 68.50 | | 440 | (a) | (a) | 34.5 | 59.6 .9 |

Note (a)—value not observed.

coarse aggregate filler is expanded powerhouse slag having an average particle size between about 5 and 48 mesh in the U. S. Sieve Series.

8. The composition of claim 1, wherein the relatively coarse aggregate filler is sand having an AFS fineness number between about 25 and 100.

9. The composition of claim 1, wherein the aqueous phenolic liquid thermosetting resin is a phenol-formaldehyde condensation product that has about a 1.45:1 mole ratio of formaldehyde to phenol, respectively, a solids content of at least about 50 percent by weight, a pH between about 5 and 9, and a viscosity at 77° F. between about 100 and 1000 centipoises.

10. A cured, rigid, formed porous medium prepared from a composition that is in accordance with the composition set forth in claim 1.

11. Method for the preparation of a composition that is particularly adapted to provide porous media which comprises intimately mixing a preponderant proportion of between about 75 and about 90 percent by weight, based on the weight of the composition, of (A) an inert filler material that consists of (1) a pulverulent filling material in an amount between about 5 and about 25 percent by weight, based on the weight of the composition, selected from the group consisting of graphite powder, silica powder and mixtures thereof, with the balance being (2) a relatively coarse particulate aggregate filler selected from the group consisting of calcined petroleum coke, expanded powerhouse slag, relatively coarse sand and mixtures thereof, with (B) a binding proportion of between about 25 and about 10 percent by weight, based on the weight of the composition, of a binder consisting of an active magnesium oxide catalyzed aqueous phenolic liquid thermosetting resin, said magnesium oxide having an initial setting time that is less than about 6 hours and being present in said binder in an amount between about 5 and 25 percent by weight, based on the weight of the resin in the composition; said resin being a phenol-formaldehyde condensation product that has a greater than 1:1 mole ratio of formaldehyde to phenol, respectively, a solids content of at least about 50 percent by weight, a pH between about 5 and 9, and a viscosity at 77° F. between about 100 and 1000 centipoises.

12. Method for fabricating porous media which comprises preparing a wet, auto-hardenable mixture of a preponderant proportion of between about 75 and 90 percent by weight, based on the weight of the mixture, of (A) an inert filler material that consists of (1) a pulverulent filling material in an amount between about 5 and about 25 percent by weight, based on the weight of the mixture, selected from the group consisting of graphite powder, silica powder and mixtures thereof, with the balance being (2) a relatively coarse particulate aggregate filler selected from the group consisting of calcined petroleum coke, expanded powerhouse slag, relatively coarse sand and mixtures thereof, with (B) a binding proportion of between about 25 and about 10 percent by weight, based on the weight of the mixture, of a binder consisting of an active magnesium oxide catalyzed aqueous phenolic liquid thermosetting resin, said magnesium oxide having an initial setting time between about 0.1 and 6 hours and being present in said resin binder in an amount between about 5 and 25 percent by weight, based on the weight of the resin in the mixture; said resin being a phenol-formaldehyde condensation product that has a greater than 1:1 mole ratio of formaldehyde to phenol, respectively, a solids content of at least about 50 percent by weight, a pH between about 5 and 9, and a viscosity at 77° F. between about 100 and 1000 centipoises; forming said wet mixture into a desired structure while it is in a plastic and flowable condition and before it has auto-hardened; permitting said formed mixture to auto-harden to an agglomerated, integral structure; and subsequently curing the integral, formed mixture at a thermosetting temperature into a rigid, porous structure.

References Cited in the file of this patent

UNITED STATES PATENTS 2,148,642    Ricard ---------------- Feb. 28, 1939

FOREIGN PATENTS 305,237    Great Britain ----------- May 2, 1930

UNITED STATES PATENT OFFICE
Certificate of Correction

Patent No. 2,870,110

January 20, 1959

Ronald H. Cooper et al.

It is hereby certified that error appears in the printed specification of the above numbered patent requiring correction and that the said Letters Patent should read as corrected below.

Columns 5 and 6, in the table, the last column thereof should appear as shown below instead of as in the patent:

| Density of Cured Medium, Lbs./cu. ft. |
| --- |
| 74.4 |
| 79.8 |
| 64.7 |
| 73.7 |
| 65.7 |
| 66.4 |
| 65.6 |
| 59.9 |

Signed and sealed this 16th day of June 1959.

[SEAL]

Attest:
KARL H. AXLINE,
*Attesting Officer.*

ROBERT C. WATSON,
*Commissioner of Patents.*